United States Patent [19]

Nakayama et al.

[11] Patent Number: 5,353,190
[45] Date of Patent: Oct. 4, 1994

[54] ELECTRIC JUNCTION BOX

[75] Inventors: Yoshiaki Nakayama; Minoru Kubota, both of Shizuoka, Japan

[73] Assignee: Yazaki Corporation, Tokyo, Japan

[21] Appl. No.: 71,493

[22] Filed: Jun. 4, 1993

[30] Foreign Application Priority Data

Jun. 9, 1992 [JP] Japan .................................. 4-149324

[51] Int. Cl.⁵ ............................................ H02B 1/10
[52] U.S. Cl. ............................ 361/647; 307/10.1; 361/641; 361/785; 439/34
[58] Field of Search ............... 307/9.1, 10.1, 112, 307/113, 147; 439/34, 620, 621; 361/600, 601, 622, 624, 626, 628–631, 641, 642, 643, 644, 646, 647, 648, 659, 663, 668, 669, 706, 720, 735, 736, 752, 775, 784, 785

[56] References Cited

U.S. PATENT DOCUMENTS

| 4,688,149 | 8/1987 | Inoue | 361/775 |
| 4,689,718 | 8/1987 | Maue | 361/360 |
| 4,942,499 | 7/1990 | Shibata | 361/428 |
| 4,972,295 | 11/1990 | Suguro | 361/386 |
| 5,023,752 | 6/1991 | Detter | 361/399 |
| 5,038,050 | 8/1991 | Minoura | 307/10.1 |

Primary Examiner—Gerald P. Tolin
Attorney, Agent, or Firm—Armstrong, Westerman, Hattori, McLeland & Naughton

[57] ABSTRACT

An electric junction box installed in an automotive instrument panel incorporates the meter board and its associated switch circuits as the internal circuit of the box. The electric junction box has an internal busbar circuit having branches that are directly connected to the meter board and the switch circuits so that they form an integral part of the internal circuit of the junction box.

4 Claims, 7 Drawing Sheets

ELECTRIC JUNCTION BOX

BACKGROUND OF THE INVENTION

1. Field of the Invention

The present invention relates to a module circuit which integrally combines a circuit of a meter board and switches incorporated into an instrument panel of automobiles with an internal circuit of an electric junction box.

2. Description of the Prior Art

Inside and outside the instrument panel of automobiles, there are many instrumentation components, as shown in FIG. 8, such as switches a, units b, and meter boards d with built-in meters c, leaving the installation space crowded with complex wiring. The wiring harness W around the meter board, in particular, has a large number of wires installed. The crowded condition is further compounded with many joints and branch lines w. To alleviate the situation and simplify the wiring, a joint box B is installed in addition to an electric junction box A containing fuses and relays (as disclosed by the Japanese Patent Preliminary Publication No. Heisei 2-45238).

FIG. 9 is an example wiring diagram of a lamp circuit using the above-mentioned electric junction box A and joint box B. In the figure, reference numeral 1a, 1b, 1c represent connectors provided to the box B; 2a, 2b, 2c switches; and 3a, 3b, 3c indicator lamps. Because five joint connections 4a, 4b to 4e are installed inside the box B, wires 5a, 5b to 5g, which constitute the trunk portion w0 of the wiring harness and are connected to the electric junction box A, are free from joint wires (branching wires connected to other wires).

However, the space available for the installation of the joint box B is not large enough to accommodate all joints. The circuits for switches a, units b and meters c are mostly related with the circuit of the electric junction box A, which is usually installed in a right lower part of the dashboard in front of the driver's seat. Hence, many of these circuits run back and forth between the electric junction box A and the meter board d.

In FIG. 9, connecting the box B, the meter board d and the switches 2a to 2c requires a total of nine connecting wires 6a, 6b to 6i. The box B is connected with 15 wires through the connectors 1a to 1c. Since there are device-to-device connecting wires between the box B and the meter board d, such as 6a, 6b–6e, wires are still closely entangled. In the figure, designated 7 are fuses provided in the electric junction box A, 8 a relay, and 9a–9d wires forming another trunk portion w0 of the wiring harness.

The aforementioned Japanese Patent Preliminary Publication No. Heisei 2-45238 proposes a wiring configuration which further reduces the number of required wires and thereby simplifies the wiring by providing in the internal circuit of the meter board a branch circuit having joint connections for the meter board and the wiring harness so that the meter board itself can accommodate the joints.

FIG. 10 shows an example of a lamp circuit with the branch circuit installed in the meter board d. That is, the joint connections 4a–4e of the box B in FIG. 9 are all accommodated in the meter board. The meter board d is provided with connectors 1a'–1c' instead of connectors 1a–1c, which were attached to the box B.

From comparison between FIG. 10 and FIG. 9, it is obvious that the wiring configuration of FIG. 10 obviates the box B and further eliminates the device-to-device connecting wires 6a–6e between the meter board d and the box B, significantly reducing the number of wires and also branch wires.

FIG. 11 shows an example switch circuit with the branch circuit installed in the meter board d. Since an appropriate number of joint connections 4 are installed inside the meter board d, two switch bases 10a, 10b are directly connected by straight wires 5, 5' having no branches. The meter board d and the electric junction box A are also connected by straight wires 5g–5j. Reference numerals 9e, 9f–9h are wires forming a trunk portion w0 of the wiring harness as in the case of FIG. 10.

Since the prior art of FIG. 10 and 11 have accommodated in the meter board d only the joints and joint box located near the meters, a large number of wires running between the electric junction box A located in the lower right portion of the dashboard in front of the driver's seat and the meters are left as is (such as wires 5a, 5b–5j). Therefore, the wiring harness still has a complex configuration, requiring many manufacturing hours and high cost. Connecting the terminal connectors of the wiring harness with the instrumentation components in a small space inside the instrument panel is difficult and requires many assembly steps.

SUMMARY OF THE INVENTION

The present invention overcomes the above drawbacks and its objective is to provide an electric junction box suitable for simplifying a wiring harness inside an instrument panel of automobiles and also reducing the number of assembly processes in automaker's plant.

To achieve the above objective, this invention provides, as described in claim 1, an electric junction box which is installed inside an instrument panel of an automobile and which comprises: branch circuits provided to an internal circuit of the electric junction box, the branch circuits being directly connected to circuits of a meter board and of at least one switch associated with and located around the meter board so that the meter board and the switch are formed integral with the electric junction box.

The electric junction box of this invention combines into a single unit the meter board, its switch circuits and the electric junction box that distributes and controls power supply for these circuits, these three members having been made as separate members. This configuration obviates the wires that were required in the conventional circuits to connect the meter board to the switch circuits and the electric junction box, simplifying the wiring harness, leading to a significant reduction in the number of assembly processes in the automaker's plant. This also increases a room inside the instrument panel for component installation.

DETAILED DESCRIPTION OF PREFERRED EMBODIMENT

Figure 1:
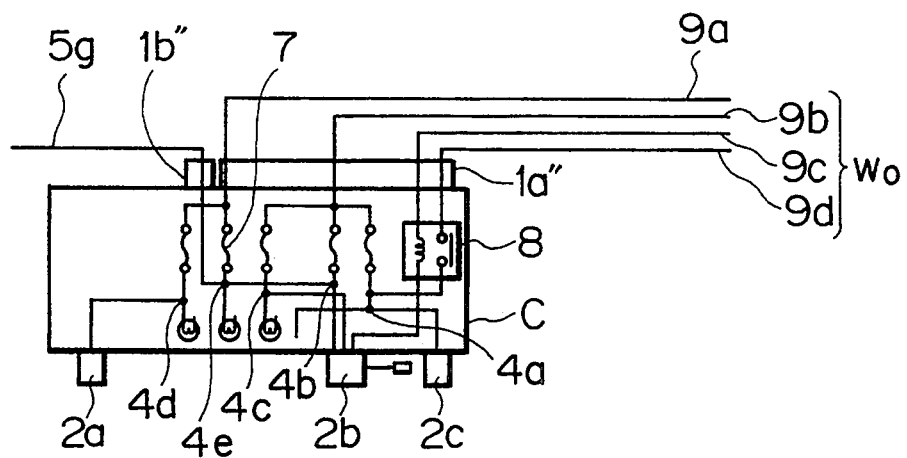
FIG. 1 is a wiring diagram of an example lamp circuit installed inside an electric junction box according to the present invention.
Figure 2:
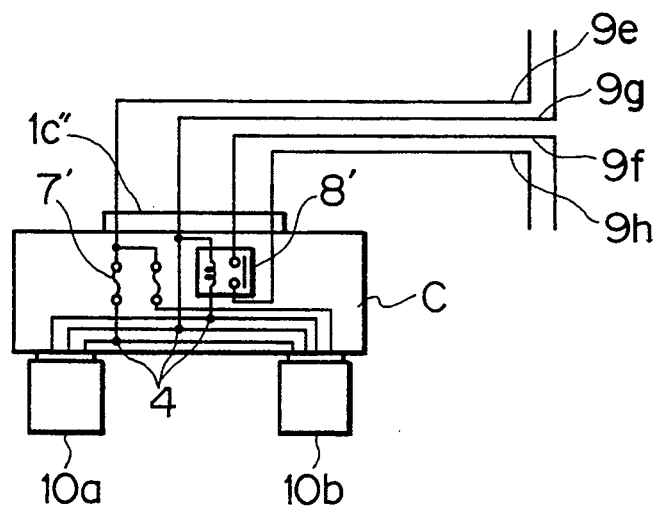
FIG. 2 is a wiring diagram of an example switch circuit installed inside an electric junction box according to the present invention.
Figure 3:
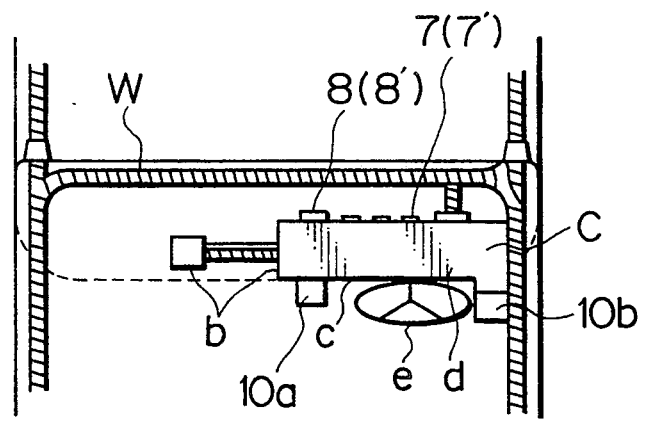
FIG. 3 is a schematic diagram showing the arrangement of wiring harness near the driver's seat according to the present invention.

FIG. 1 shows the wiring diagram of a lamp circuit installed inside an electric junction box according to the present invention; FIG. 2 shows the wiring diagram of a switch circuit in the electric junction box of the present invention; and FIG. 3 shows the arrangement of the wiring harness around the driver's seat using the electric junction box. Elements which are identical with those in conventional examples are given like reference numerals.

Figure 10:
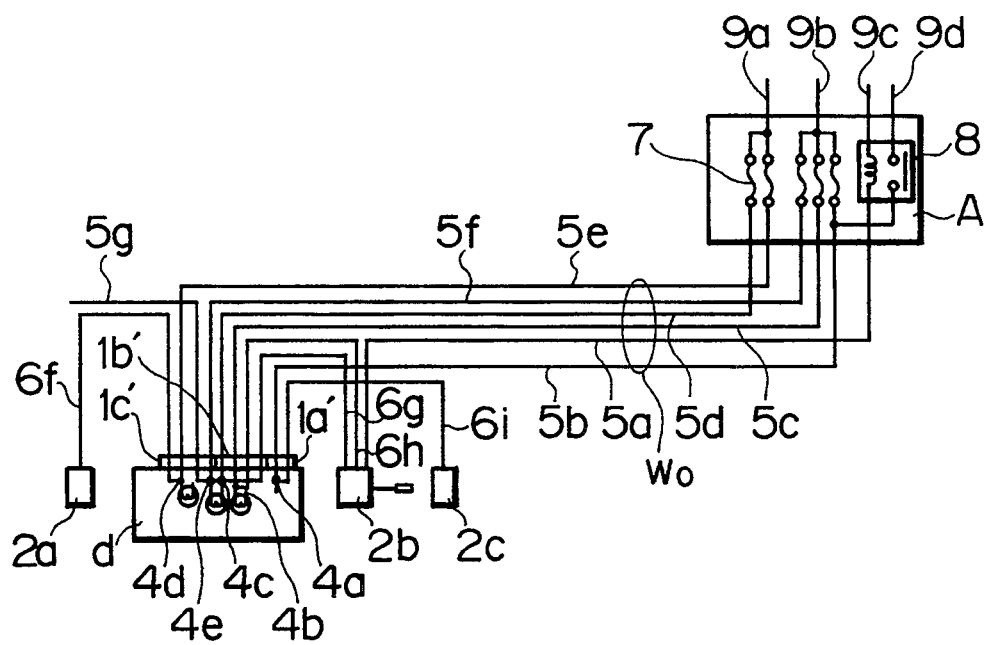
FIG. 10 is a wiring diagram showing another lamp circuit in a conventional wiring harness.

The lamp circuit of FIG. 1 has an electric junction box C, which incorporates five joint connections $4a$, $4b$–$4e$ that were conventionally contained in the meter board d of FIG. 10, as well as five fuses 7 and a relay 8 that were conventionally installed in the electric junction box A. Three switches, such as fog lamp switch $2a$, turn switch $2b$ and spare switch $2c$ are directly attached to the electric junction box C. Further, two connectors $1a''$, $1b''$, instead of three connectors $1a'$, $1b'$, $1c'$ that were installed in the meter board d, are directly mounted to the electric junction box C. Through the connector $1a''$ the electric junction box is connected with four wires $9a$, $9b$–$9d$ of the trunk portion w0 and, through the connector $1b''$, is connected with a straight wire $5g$.

As a result, this arrangement eliminates seven wires $5a$, $5b$–$5g$ of FIG. 10 that connect the meter board d, the electric junction box A and the switch b and four device-to-device connecting wires $6f$, $6g$–$6i$ of FIG. 10 between the meter board d and the switches $2a$–$2c$. That is, a total of 11 wires can be eliminated from the prior art circuit construction of FIG. 10.

Figure 11:
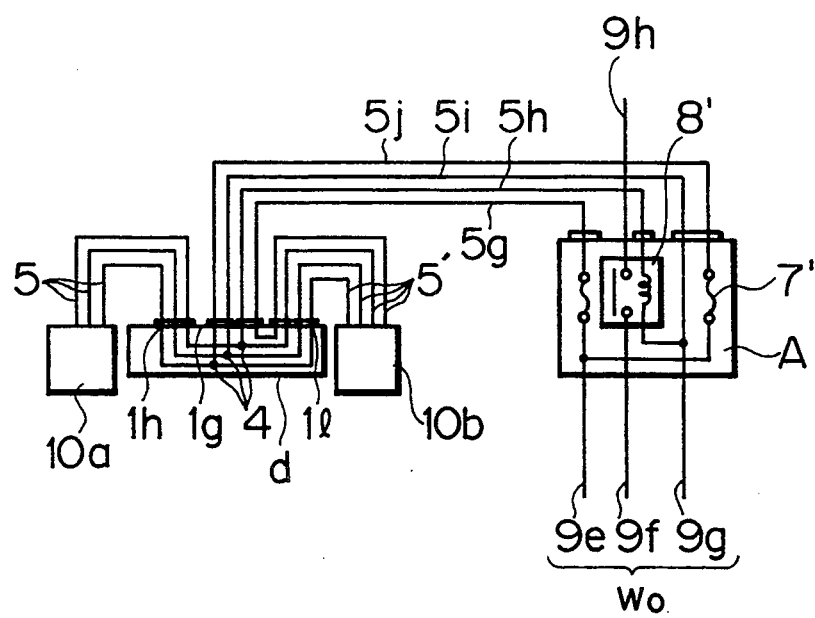
FIG. 11 is a wiring diagram showing a switch circuit in a conventional wiring harness.

In the switch circuit of FIG. 2, the electric junction box C incorporates three joint connections 4 that were conventionally installed in the meter board of FIG. 11 and two fuses $7'$ and a relay $8'$ that were conventionally contained in the electric junction box A of FIG. 11. Further, the electric junction box C of this embodiment has two switch bases $10a$, $10b$ directly mounted thereto.

This arrangement eliminates a total of 11 wires—four wires $5g$, $5h$–$5j$ running between the meter board d and the electric junction box A and seven wires 5, $5'$ between the meter board d and the switch bases $10a$, $10b$. As a result, it is possible to directly connect the four wires $9e$, $9f$–$9h$, which form the trunk portion w0 of the wiring harness, to the electric junction box C through the connector $1c''$.

Figure 8:
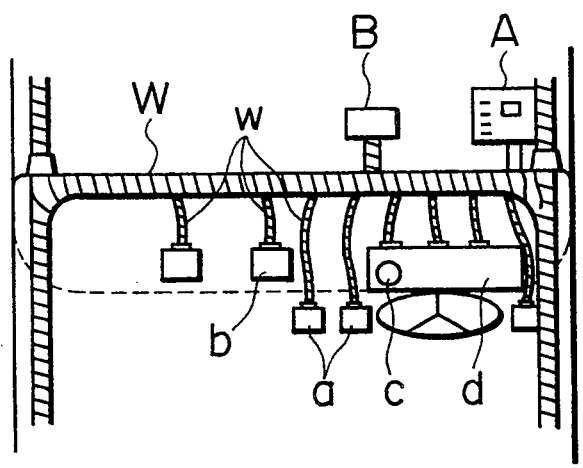
FIG. 8 is a schematic diagram showing the arrangement of a conventional wiring harness near the driver's seat.
Figure 9:
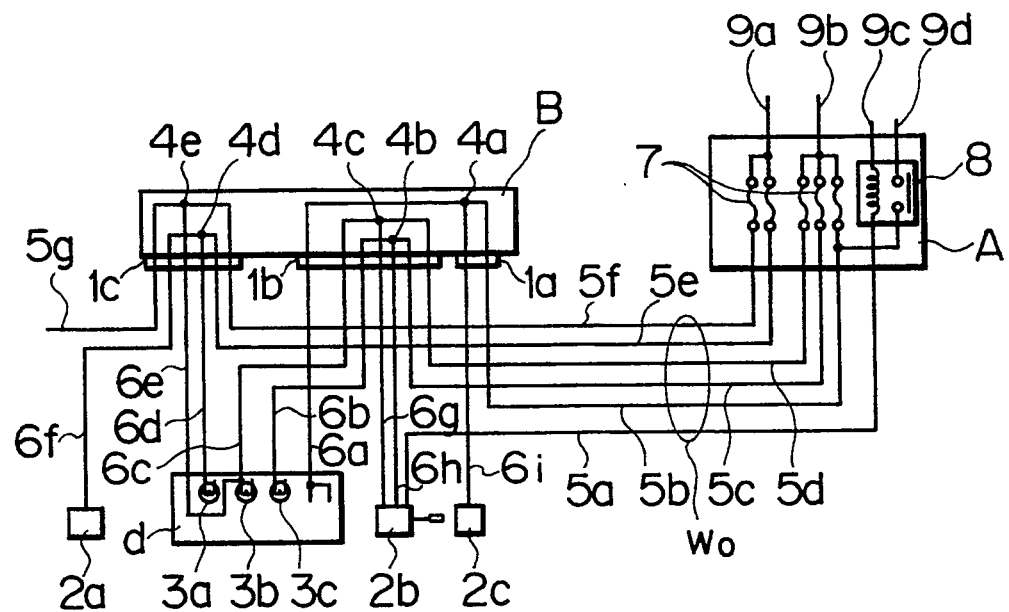
FIG. 9 is a wiring diagram showing a lamp circuit in a conventional wiring harness.

As is seen from comparison between FIG. 3 and FIG. 8, of which the latter represents the conventional arrangement, the wiring harness W is cleared of the conventional electric junction box A and has no or fewer branch wires w. The simplified wiring harness in turn will contribute to significantly improved efficiency in the manufacture and assembly of the wiring harness into cars.

Figure 4:
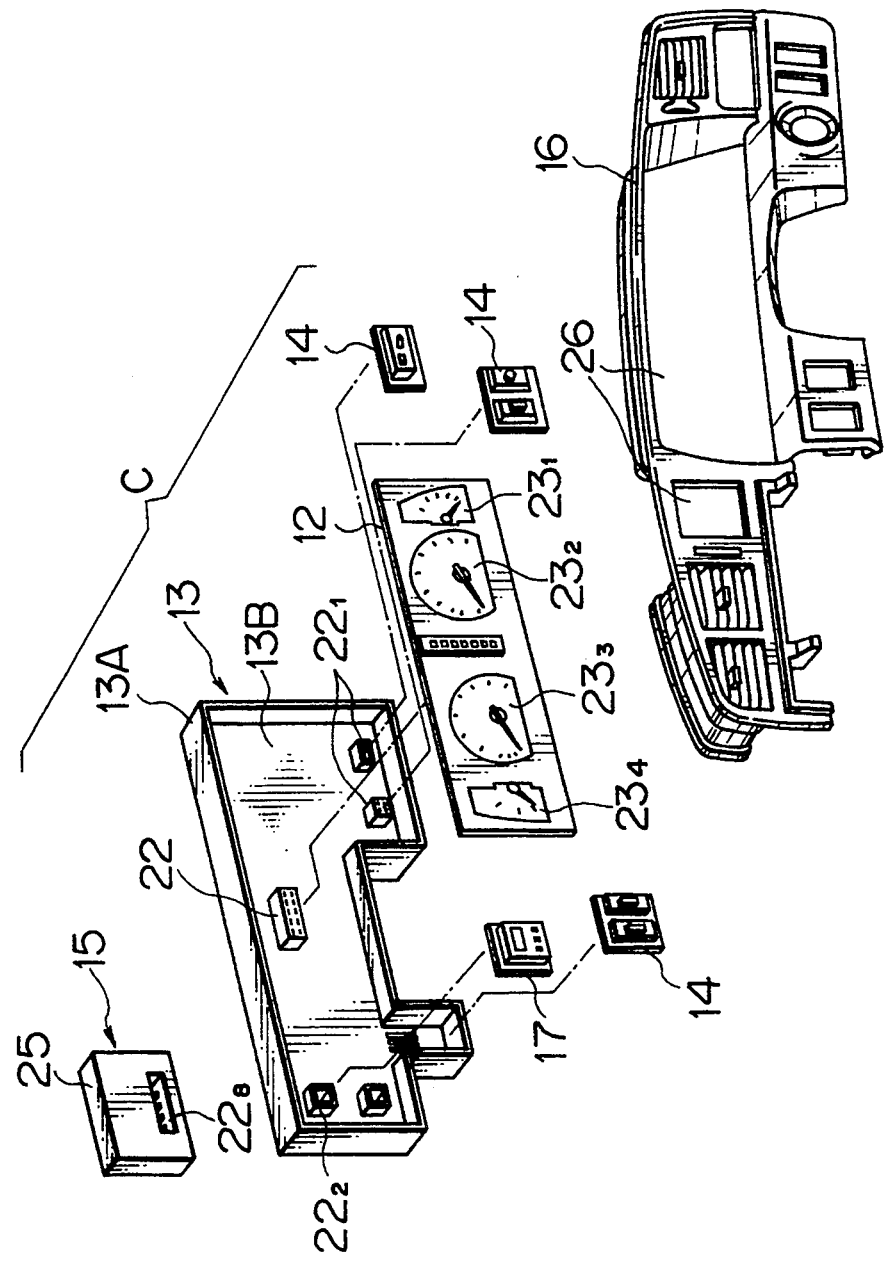
FIG. 4 is an exploded perspective view of an instrument panel using the electric junction box of the present invention.
Figure 5:
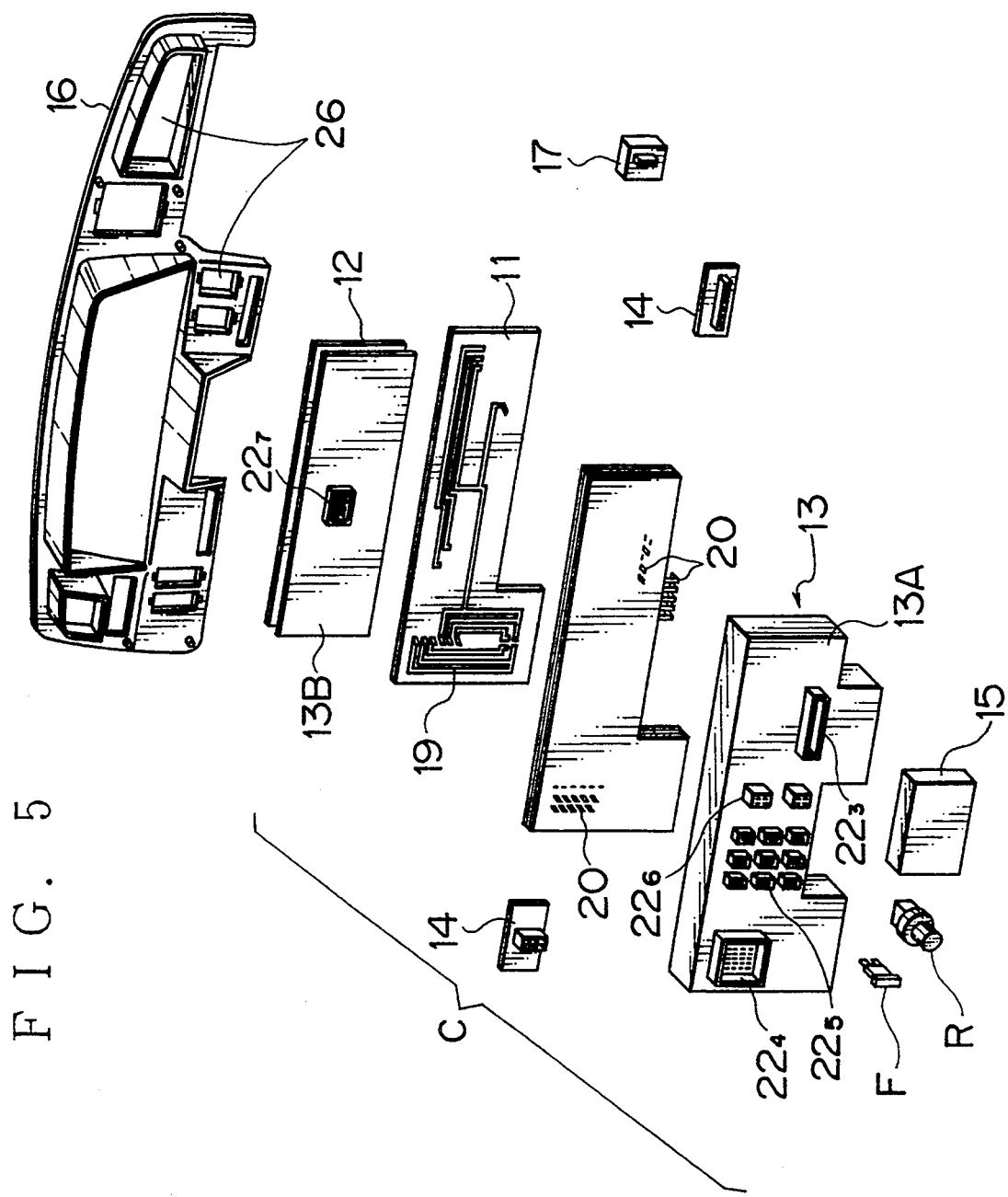
FIG. 5 is an exploded perspective view of FIG. 4 as seen from the rear.
Figure 6:
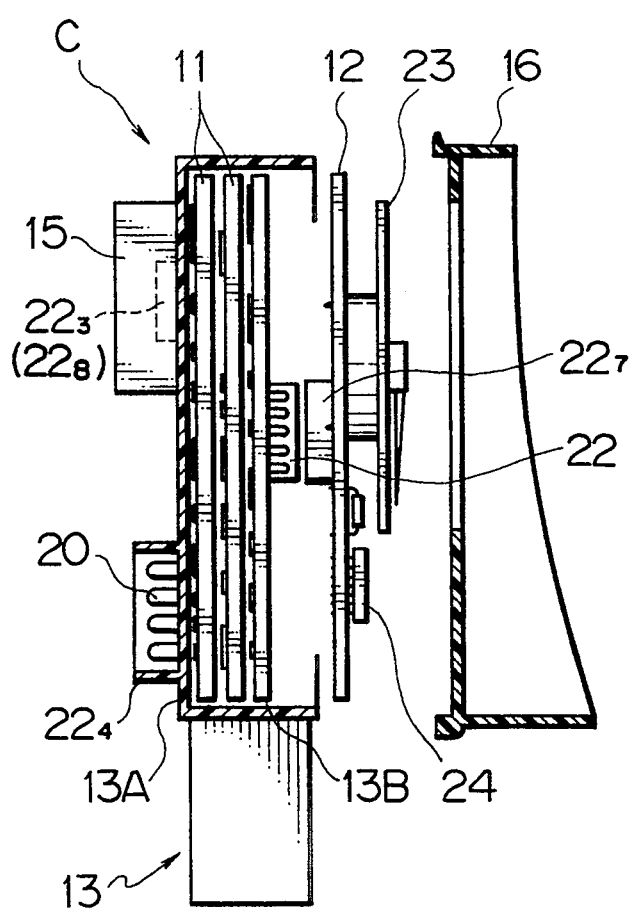
FIG. 6 is a vertical cross-sectional view of a partly assembled instrument panel of FIG. 4.
Figure 7:
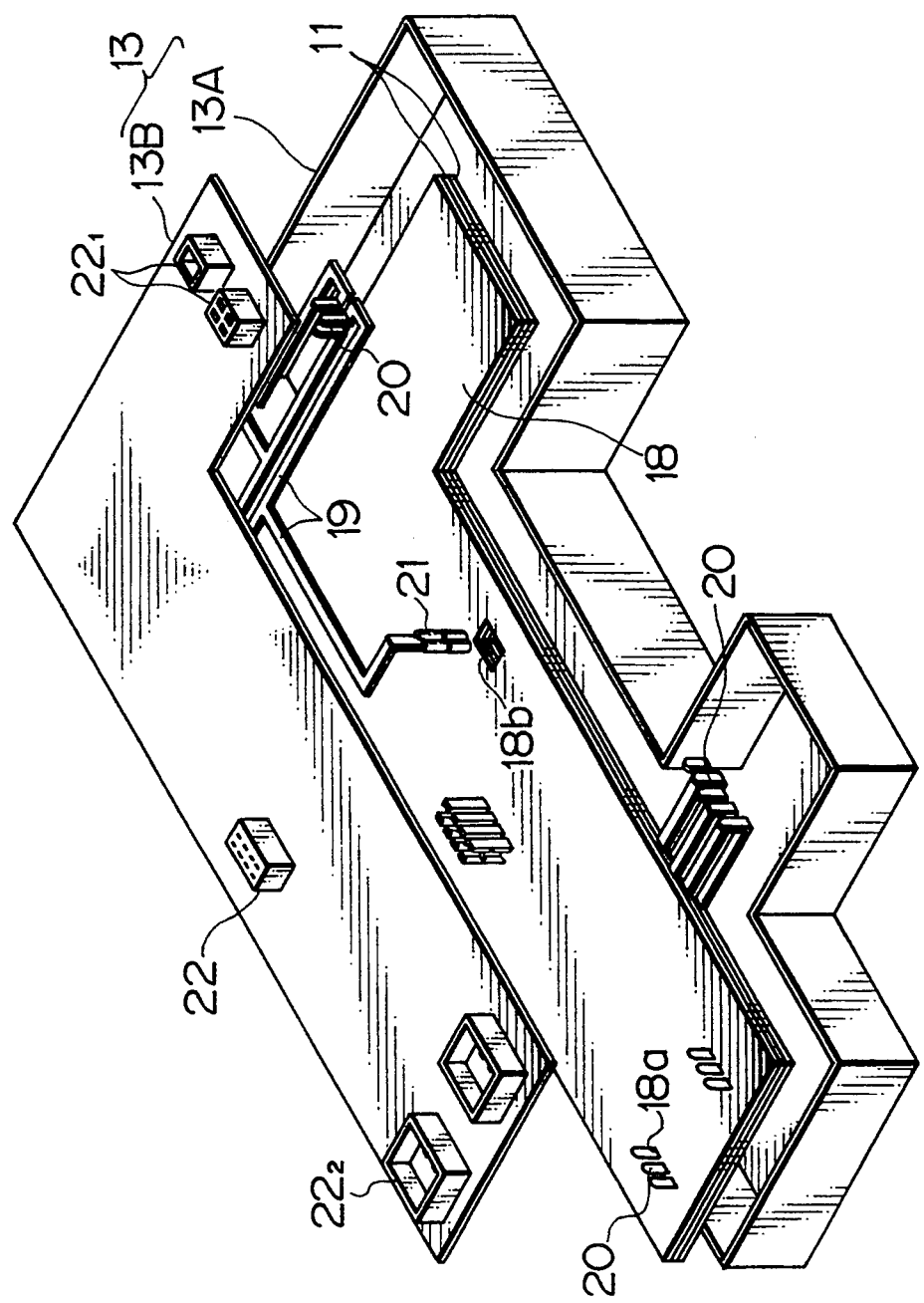
FIG. 7 is an enlarged perspective view of an essential portion of FIG. 4.

FIG. 4 is an exploded perspective view of an example electric junction box having the internal circuit configuration described above. FIG. 5 is an exploded perspective view as seen from the rear. FIG. 6 is a vertical cross section of a partly assembled electric junction box. FIG. 7 is an enlarged perspective view of an essential portion of FIG. 4.

In these figures, the electric junction box C includes a busbar circuit board 11, a meter board 12, a case 13, a switch board 14 and an electronic unit 15. Designated 16 is a meter cluster component.

The case 13, as shown in FIG. 7, consists of a case body 13A and a case cover 13B and accommodates a plurality of busbar circuit boards 11 stacked one upon the other. Each of the busbar circuit boards 11 has a construction, similar to the conventional one, in which busbars 19 of a desired pattern are formed on an insulating board 18. Each busbar 19 has terminal tabs 20 branching up or down from the ends or intermediate portions thereof. These terminal tabs are arranged as connector terminals as shown. Denoted 21 is a female-to-female junction terminal used to connect the terminal tabs 20 to electric components such as relays not shown.

Designated $18a$ and $18b$ are terminal insertion holes formed in the insulating board 18. The case cover 13B is provided with connectors such as a meter connector 22, a switch connector $22_1$ and a clock connector $22_2$, for accommodating the above-mentioned connector terminals. Similarly, the case body 13A, as shown in FIG. 5 and 6, is provided with connectors including a unit connector $22_3$, a wiring harness connector $22_4$, a relay connector $22_5$ and a fuse connector $22_6$.

The meter board 12 is mounted with various meters such as a water thermometer $23_1$, a tachometer $23_2$, a speedometer $23_3$ and a fuel gauge $23_4$. On the back side the meter board 12 has an electric junction box connector $22_7$, as shown in FIG. 6, and also is formed with a printed circuit (not shown) for connecting the connector $22_7$ with the meters. Denoted 24 is an electronic component including resistors, capacitors and ICs all connected to the printed circuit.

The electronic unit 15 accommodates a so-called function circuit, consisting mainly of a printed circuit board (not shown) in a unit case 25 and, on the outside of the case, is provided with an electric junction box connector $22_8$. The function circuit is the one which processes within itself incoming signals that can be processed without requiring additional data, and then produces the result, as described in the Japanese Patent Publication No. Heisei 3-43100.

The meter cluster component 16 is formed with a plurality of windows 26 through which to mount the meter board 12, switch board 14 and clock 17.

In the above construction, the electric junction box is assembled in the following manner. That is, as shown in FIG. 6, the busbar circuit boards 11 are stacked in the case body 13A, followed by the case cover 13B being placed on the case body and fixed with not-shown screws and other locking means. Then, the meter connector 22 and the electric junction box connector $22_7$ are connected together to mount the meter board 12. The switch connector $22_1$ and the clock connector $22_2$ are connected with the switch board 14 and the clock 17 respectively. Then the unit connector $22_3$ and the junction box connector $22_8$ are connected together to connect the electronic unit 15 to the junction box. The relay connectors $22_5$ and the fuse connectors $22_6$ are mounted with relays R and fuses F. In this way, the assembly of the electric junction box C can be carried out easily.

The electric junction box C is then assembled into the meter cluster component 16 so that they can be handled as an integral module. An automotive manufacturer need only mount the module in the instrument panel and connect a wiring harness (not shown) to the wiring harness connector $22_4$ to complete electrical connections associated with the meters.

Since this electric junction box C accommodates in its case 13 a plurality of stacked busbar circuit boards 11 having branch busbars 19 and has a meter connector 22 and various other connectors $22_1$–$22_6$ mounted on the outside of the case, it offers the same functions as the conventional electric junction box. In other words, it has a function of circuit division and jointing by relays and fuses and enables common sharing of the meter circuit (printed circuit on the back of the meter board 12), power supply circuit for the switch circuit, grounding circuit and signal lines.

As described above, the meter board and its associated switch circuits are incorporated into the internal circuits of the electric junction box, which is then directly mounted in the instrument panel (meter cluster component). This arrangement reduces significantly the number of wires associated with the meter board, simplifying the wiring configuration of the wiring harness. This in turn leads to a substantial reduction in the assembly cost on the part of the automakers.

What is claimed is;

1. An electric junction box installed inside an instrument panel of an automobile comprising:
   branch circuits provided to an internal circuit of the electric junction box, the branch circuits being directly connected to circuits of a meter-carrying meter board and of at least one switch mounted adjacent to the meter board wherein the meter board and the switch are directly mounted to the electric junction box.

2. An electric junction box as claimed in claim 1, wherein the internal circuit of the electric junction box including the branch circuits comprises a plurality of busbar circuit boards stacked one on the other, the busbar circuit boards each comprising an insulating board and busbars of desired patterns formed thereon.

3. An electric junction box as claimed in claim 1, wherein the branch circuits are connected to the meter board via a connector provided on a wall of the electric junction box on which the meter board is integrally mounted.

4. An electric junction box as claimed in claim 1, wherein said at least one switch is integrally mounted on the wall of the electric junction box via a connector provided thereon through which the branch circuits are connected to the switch.

* * * * *